United States Patent [19]
Pyne

[11] 3,750,107
[45] July 31, 1973

[54] METHOD AND SYSTEM FOR PROCESSING CHARACTERS ON A REAL TIME BASIS

[75] Inventor: John M. Pyne, West Chester, Pa.
[73] Assignee: Sci-Tek, Inc., Wilmington, Del.

[22] Filed: Oct. 27, 1971
[21] Appl. No.: 192,800

[52] U.S. Cl. .......... 340/172.5
[51] Int. Cl. .......... G06f 3/04
[58] Field of Search .......... 340/172.5; 235/157

[56] References Cited
UNITED STATES PATENTS

| | | | |
|---|---|---|---|
| 3,510,843 | 5/1970 | Bennett et al. | 340/172.5 |
| 3,298,001 | 1/1967 | Couleur et al. | 340/172.5 |
| 3,569,943 | 3/1971 | Makle et al. | 340/172.5 |
| 3,473,156 | 10/1969 | Couleur et al. | 340/172.5 |
| 3,308,439 | 3/1967 | Tink et al. | 340/172.5 |
| 3,571,806 | 3/1971 | Makle et al. | 340/172.5 |
| 3,337,855 | 8/1967 | Richard et al. | 340/172.5 |

*Primary Examiner*—Raulfe B. Zache
*Assistant Examiner*—Mark Edward Nusbaum
*Attorney*—Mortenson & Weigel

[57] ABSTRACT

There is described herein a real time method and system for transferring characters between several user terminals, operating at different character transfer speeds, and a central processing unit. The characters are transmitted between the user terminals and the central processing unit on a multiplexed basis and are individually examined upon receipt at the central processing unit. Output timing patterns, capable of operating into the several user terminals through the multiplexer, as determined by the input examination, are stored in the central unit for each user terminal. The characters after processing are transmitted back to the appropriate user terminal under the control of an appropriate output timing pattern which synchronizes the transmission with the user terminal operating speed. This output timing pattern is held in a shift register and shifted out bit by bit to control the transmission or non-transmission of a character. If no transmission is indicated an idle character is sent. Upon completion of the shifting process for the desired number of characters, the residue remaining in the shift register is examined and utilized to control what new timing pattern is reintroduced into the shift register for transmission of the next character to that particular user terminal. A counter is decremented with the transmission of each character to control the number of shift pulses applied to the shift register.

11 Claims, 10 Drawing Figures

INVENTOR
John M. Pyne
BY
Mortenson and Weigel
ATTORNEYS

INVENTOR
John M. Pyne
BY Mortenson and Weigel
ATTORNEYS

Input Logic

INVENTOR
John M. Pyne
BY
Mortenson and Weigel
ATTORNEYS

Input Logic

INVENTOR
John M. Pyne
BY
Mortenson and Weigel
ATTORNEYS

INVENTOR
John M. Pyne
BY
Mortenson and Weigel
ATTORNEYS

Output Logic

INVENTOR
John M. Pyne
BY Mortenson and Weigel
ATTORNEYS

Output Logic

INVENTOR
John M. Pyne
BY
Mortenson and Weigel
ATTORNEYS

INVENTOR
John M. Pyne
BY
Mortenson and Weigel
ATTORNEYS

INVENTOR
John M. Pyne
BY
Mortenson and Weigel
ATTORNEYS

METHOD AND SYSTEM FOR PROCESSING CHARACTERS ON A REAL TIME BASIS

BACKGROUND OF THE INVENTION

This invention relates to a method and system by which various user terminals having different operating speeds are capable of operating through a multiplexer into and out of a central processing computer on a real time basis.

Various user terminals have been developed for utilization by customers in the computer service industry. These user terminals often have different operating speeds, utilize different codes, and because of the different codes have different character transfer speeds. Ordinarily, no problem arises from these different operating speeds inasmuch as various multiplexing equipment has been developed for the transmission of information from the different units from one location to another. On the other hand, when these units must all operate on a real time basis into a central processing unit as part of some central data file, immediate synchronization problems arise on retransmitting information back to the several user terminals. In a securities validation system, for example, a central computerized file of stolen, lost or missing stock certificates and other securities is maintained. Users such as banks and brokerage houses have then but to utilize whatever terminal facilities they have to interrogate the central file to ascertain whether a certificate that they have been presented has been reported lost, stolen or missing.

The synchronization problem arises, of course, because of the variety of available user terminals equipment which can include dataphone, TWX, or telex systems by way of example. Each of these systems have different operating characteristics as noted hereinbefore. The dataphone operates in the so-called 8-level ASCII code which has a bit transfer rate of 110 baud (bits per second) and is capable of transmitting and receiving 10 characters per second. TWX systems on the other hand may be broken down into three row or four row (according to the number of rows on the TWX machine keyboard). Each of these systems have different codes and different operating speeds. The four row system, for example uses an 8 level ASCII code and has a bit transfer rate of 110 baud and a character transfer rate of 10 characters per second. On the other hand the three row TWX systems utilize a 5-level Baudot code which has a bit transfer rate of 45.5 baud and transmits 6.06 characters per second. The three row systems when in use with a multiplexer always use a code converter so that the Baudot code is converted to ASCII code for transmission purposes. Finally, the telex user terminals utilize a five level Baudot code which has a bit transfer rate of 50 baud and transmits 6.6 characters per second.

All of these systems can be quite handily accommodated utilizing existing equipment and may be coupled to a central multiplexing unit for transmission to the location of the computer in which the data base is stored. The existing time-division multiplexing equipment is capable of receiving this information from the several terminals, storing the same in a buffer and then integrating the successive characters of information into the multiplexed frames of information that are transmitted. On the other hand, when the information is received by the computer and processed and the information is then to be returned to the respective user terminals through the same multiplexing system, an immediate problem arises because of the different operating speeds and codes of the several units. In short, unless excessive storage is to be built up at each user terminal, the information must be transmitted back over the multiplexing system at the appropriate rates for each of the user terminals.

It is, therefore, an object of this invention to provide an improved method for the transmission of information between user terminals having different operating speeds and a central processing unit having still another operating speed.

Another object of this invention is to provide an improved system for the transfer of information on a real time basis between user terminals having different character operating speeds and a central processing unit having still another operating speed.

BRIEF DESCRIPTION OF THE INVENTION

The method of this invention makes possible the processing of characters of information representations on a real time basis in a data processing unit for transfer to and from first and second data terminals having corresponding first and second different character handling rates through a time division multiplexer having a third character handling rate different from said first and second rates which multiplexes characters from said terminals for transfer to said unit and then remultiplexes said characters from said unit for retransfer to said terminals, storing output timing pattern representation interrelating the third rate with each of said first and second rates, examining each incoming character to determine its source terminal, processing the character from each said terminal in said unit to provide processed characters, and transferring the processed characters back to respective ones of said terminals under the control of corresponding ones of the stored timing patterns whereby the speed rate changes necessary to accommodate said terminals are made.

In a preferred embodiment of the invention, output timing counts corresponding to the respective ones of the patterns denoting the number of pattern representations that should be checked are stored. Next, each of the pattern representations are tested sequentially according to the count representations and the processed characters are selectively transferred, according to the testing, back to the terminals.

This method is implemented by a system having first and second character storage units for storing representations of the characters from each of the data terminals in respective ones of the units and first and second data terminals, or line status storage units, for storing information relating to information held in corresponding ones of the character storage units. A terminal output storage unit stores timing pattern representations corresponding to the character rates of the different types of terminals. A test means is provided for testing each character transferred to the processing unit and a gate means is responsive to the test means for transferring the appropriate timing pattern representations to one or another of the line status storage units. Finally, a transfer means is responsive to the line status storage unit timing pattern representations for transferring processed characters back at the proper rate to the multiplexer for demultiplexing.

BRIEF DESCRIPTION OF THE DRAWINGS

The novel features that are considered characteristic of this invention are set forth with particularity in the appended claims. The invention itself, however, both as to its organization and method of operation, as well as additional objects and advantages thereof will be best understood from the following description when read in connection with the accompanying drawings, in which:

DESCRIPTION OF THE PREFERRED EMBODIMENT

Figures 1, 5:
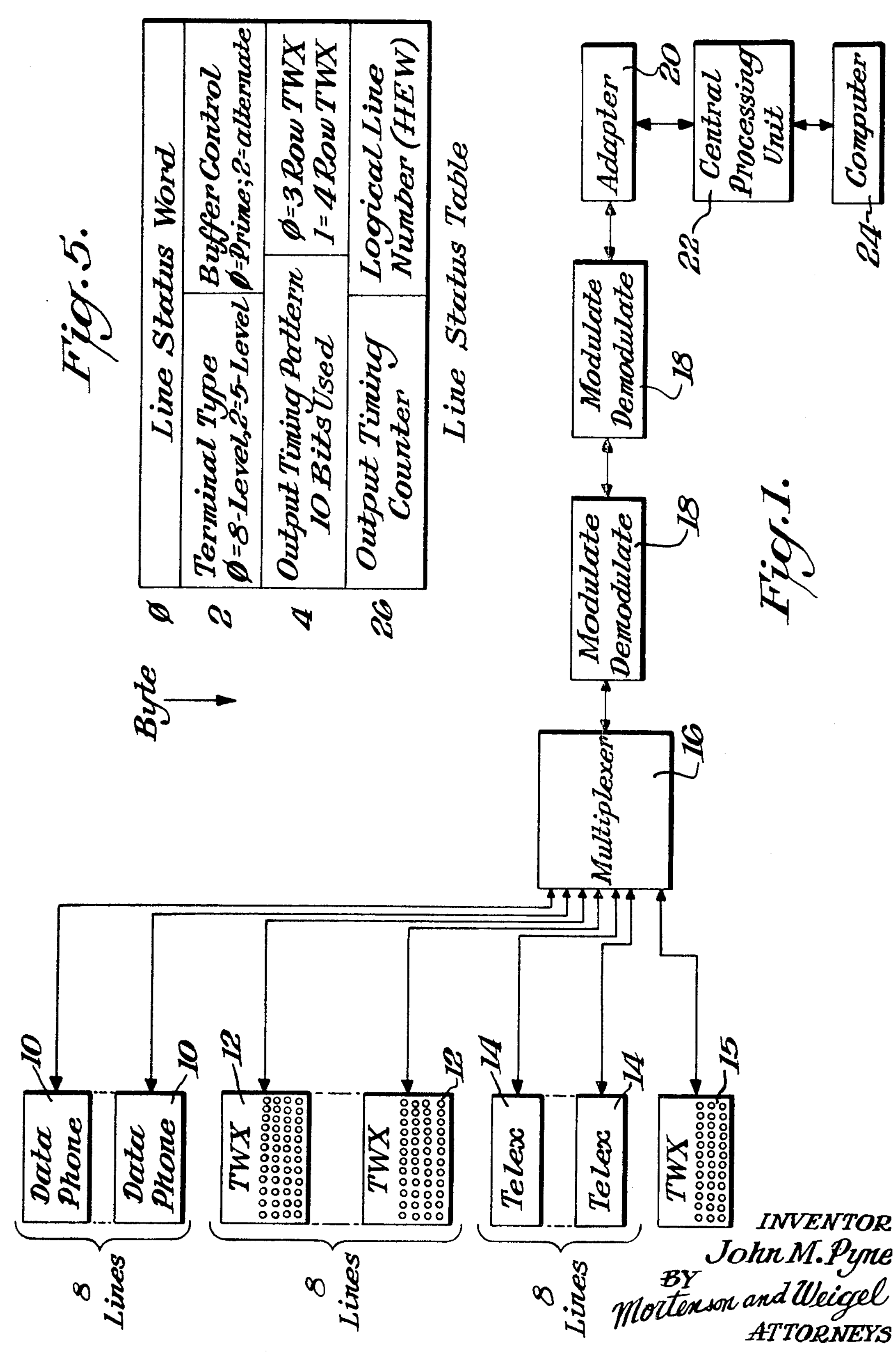
FIG. 1 is a block schematic representation of an information handling system in which a plurality of user terminals each having different character operating rates operate through a multiplexed line to a central computer.
FIG. 5 is a diagramatic representation of a line status table that is used in the central computer for the handling of information at the several data terminals.

The method of this invention may be operated using the system illustrated in FIG. 1. In this figure there is shown various user terminals such as the dataphone terminals 10, 4 row TWX terminals 12, telex terminals 14 and 3 row TWX terminals 15 operating into a suitable multiplexer 16. As noted, hereinbefore, each of the user terminals 10, 12, 14 and 15 for the most part utilize different codes, have different baud rates and different character transfer rates. Each typically operates through suitable adapters (not shown) into the multiplexer 16 which may be a time division multiplexing system preferably designed for data transmission networks that utilize voice grade facilities. The multiplexer performs the conventional function, in this case, of reducing the number of lines required for the handling of the transmission of information between two distant points with the resultant saving in cost. A suitable multiplexer that may be used with this system is a time share multiplex unit known as the "Ultracom" sold by Ultronic Systems Corporation, a subsidiary of Sylvania Electric Products, Inc. The multiplex unit provided by Ultronic may be described as "transparent" inasmuch as it is functionally independent of the data terminal equipment. The multiplexer operates such that the several characters from the several user terminals 10, 12, 14 and 15 are inserted into a time space reserved for one character from each of the input terminals to make up a typical multiplex data frame. The data frame operates at the character rate of the fastest running of the several input terminals. A typical data frame in the Ultracom unit consists of 42 characters plus 2 sync characters. Thus, if the user terminals operated at top speed of 10 characters per second, a complete data frame will appear in the high speed output line approximately every 100 miliseconds. This period is referred to as the frame time. During each frame time all of the data information for each of the channel adapters (not shown) used to input the multiplexer that have a complete character stored are serially transferred onto the high speed line. This information includes 16 sync bits and the data bits from each of the channels. The slower input terminals are sampled at a rate that is higher than their input character rate, hence, each multiplex frame will not always have a data character for the slower channels. In this event, an idle or marking condition is transferred to the higher speed line.

Each low speed terminal has a send leg connected to the input portion of its channel adapter, the output of which appears on a common path or data bus in the multiplexer. In like manner each terminal has a receive leg connected to the output portion of the channel adapter which receives information from a data bus in the opposite signal path. Control logic in the send and receive paths provides clock, sync and addressing which control the transfer of data between the channel adapters and the high speed lines. Data is received and processed in a manner which is similar but opposite to that described for data transmission. The receive control logic maintains synchronization with the data frames transmitted by the distant end.

By way of further description, the block 10 denoted as "dataphone" may be simply a 103A Data Set available on lease from American Telephone & Telegraph Company. This Data Set couples a port or input on the multiplexer 16 to the direct dial telephone system. Associated with each dataphone is a specific seven digit number which as user dials to enter the system. Specifications describing the 103A Data Set are set forth in a catalogue entitled "Bell System Datasets" copyright American Telephone & Telegraph Co. 1970. The dataphone answers a call with a datatone, converts the input flow of data from an analog signal (on the telephone line) to a binary signal which is then passed on to the multiplexer and converts the output flow of data from the binary signal of the multiplexer to an analog signal which is placed on the telephone line and transmitted to the user.

The TWX terminals 12 are a dial message switching network which is provided by Western Union. Any TWX subscriber can call and submit a message to any other TWX subscriber. The block 12 simply denotes an interface provided by Western Union that allows entrance into the TWX network. In essence, each interface couples any TWX subscriber to a port on the multiplexer 16. The interface itself is comprised of a data auxiliary set 811B available from American Telephone & Telegraph Co. and a 101C dataset which is very similar to the 103A dataset just described. A description of this interface may be found in the Bell System Data Communications Technical Reference, "Station Arrangements To Provide TWX Service For Customer-Provided Terminals" (Data Auxiliary Set 811B) September, 1968, American Telephone & Telegraph Co.

The blocks 14 denoted Telex represent a dial message service offered by Wester Union. It uses a five level Baudot code, however, it operates at a low speed (6.67 characters per second). The block 14 simply denotes an interface that couples a number of ports on the multiplexer to the telex system. The interface itself may be a model no. 12151-A computer interface available from Western Union. These interfaces are described in Engineering Bulletin 5459-A entitled "Standard Telex-Computer Interfaces 12150-A and 12151-A" copyright 1969 by Western Union.

The multiplexer designated by block 16 combines, on input from the users, all input data streams (dataphone, TWS and Telex) into one higher speed (450 characters per second) data stream. On output (to the users) the multiplexer converts the high speed data stream from block 18 and transmits the respective data characters at the proper low speed to each of the user terminals. A suitable multiplexer is described in a manual entitled "Time Share Multiplexing Unit - TSMU" available from Ultronic Systems Corp., a subsidiary of Sylvania Electric Products, Inc. In this manual, suitable adapters or interfaces to the dataphone, TWX and telex units are described. Also described is a suitable interface to the high speed data set or modem block 18. Alternatively, another suitable time share multiplex unit is described in a publication entitled "Time Share Multiplex Unit, System Reference Manual," Ultronic Systems Corporation, Morristown, New Jersey, printed in 1969.

From the multiplexer 16 the multiplex data is now transmitted to a modem 18. A suitable modem for this purpose is manufactured by International Communications Corporation, Miami, Florida and is known as the "MODEM 3300 Data Set." Any other suitable modem of known type may be used for this purpose. The modem is a modulator-demodulator communications transmitting-receiving device that simultaneously processes two channels of serial binary data either over dedicated or dial-up telephone lines. The MODEM 3300 Data Set has a primary channel transmitter in which synchronized binary data is encoded, three bits at a time, to produce control levels which both phase and amplitude modify an intermediate frequency signal. The phase of the *i-f* is shifted to one of four increments producing a differential four phase modulation. Simultaneously, the amplitude of the *i-f* signal is shifted to one of two increments producing two amplitude modulations. The rate of change is 1,200 changes per second. The resulting 8-level signal is mixed with a local oscillator signal through a balanced modulator circuit to produce a composite spectrum containing several bands of data. The audio frequency side band is carefully filtered from the composite signal, amplified, and transformer coupled to the telephone line facility for transmission to the distant moden at which point the signal is demodulated. In that the distant modem the line signal is transformer coupled into an amplifier whose input drives an audio band pass filter. The filter drives a statistical equalizer circuit whose function is to offset the typical distortions introduced by the phone lines. This filter also provides an input to an automatic gain control amplifier whose output remains constant for a plus or minus 15 db change in received line signal level.

The AGC output is mixed with a local oscillator signal through a balanced modulator circuit and an *i-f* side band is carefully filtered out of the resulting composite spectrum. The phase data is extracted from the *i-f* signal using coherent phase comparison techniques. Phase data detector circuits then determine the relative phase shifts in the *i-f* side band signal and special circuitry is used to recover the amplitude modulated information. The received phase and amplitude data is then assembled and shifted out of the modem to the data terminal equipment along with the appropriate receiver timing signal. The synchronized data from the modem 18 is then passed on to an adapter 20.

The modem unit denoted by the block 18 performs essentially the same function as the 103A data set previously described except that the speed is in the order of 450 characters per second instead of the 30 characters per second typical of the data set. Also, the communication is performed synchronously instead of asynchronously as in the data set. A typical unit that may be purchased to provide this function is the Modem 3300/36 Data Set as noted above. Such Data Set is described in a publication by International Communications Corporation, NR 4402D33/1M/1070, published October 1970.

The adapter 20 provides an interface between a central processing unit 22 and the modem 18. A suitable adapter for this purpose is one known as the 201 Data-set Adapter manufactured by InterData, Inc. of Oceanport, New Jersey.

The adapter 20 may be in its typical physical environment a part of the central processing unit (block 22) and its purpose is to clock the data into or out of the block 22. A description of a suitable 201 Data Set Adapter is found in the publication entitled "Operating and Programming Manual" Interdata publication NR29-116 printed September 1969 by Interdata, Inc. One of the primary functions of the adapter is to search for the sync signals from each multiplexed frame and to interrupt the central processing unit 22 each character of each frame. When signals are received by the adapter 20 from the modem 18, the data and bit clock pulses from the modem 18 are converted from bi-polar signals to DTL levels. The data then enters a shift register and is sequentially shifted through the register under the control of a clock pulse. After every data shift, the contents of the shift register are examined by the sync character detector circuit which is wired to recognize a particular pattern specified. Each time a sync character is recognized an interrupt signal to the central processing unit 22 is generated.

In the reverse, when data is being received in a multiplexed form from the central processing unit 22, as will be described hereinafter, such data is loaded into a buffer register, gated to a shift register, and shifted to a bi-polar data driver circuit for transmission to the modem 18.

The central processing unit 22 may be any suitable programable (or hard-wired) mini computer such as one manufactured by InterData, Inc.

A suitable unit is described in the publication "Systems Interface Manual" NR39-003R02 printed August 1969 and another publicaton entitled "Reference Manual" NR29-004R02 printed August 1969 by Interdata, Inc. This computer is utilized to demultiplex the information received, hold it in regrouped or demultiplexed form until a complete message from a terminal is received and at the time transmit it onto a computer bank 24 in which the file material or data base is held. The computer 24 may, for example, be a Univac 1108 computer or any other suitable large scale machine having massive storage facilities capable of storing the files needed. The information is processed by the computer 24. This processing may include such procedures as looking up the current status, i.e., is it lost, stolen or otherwise, of a particular security. Information as to its status or otherwise is then transmitted back to the central processing unit 22 where the material, using the method and/or system of this invention, is multiplexed again and returned, at the proper character transfer rate, to each of the user terminals. The return takes place through the adapter 20 and the modems 18 to be demultiplexed and transmitted to the respective user terminals 10, 12, 14 and 15.

Figure 2:
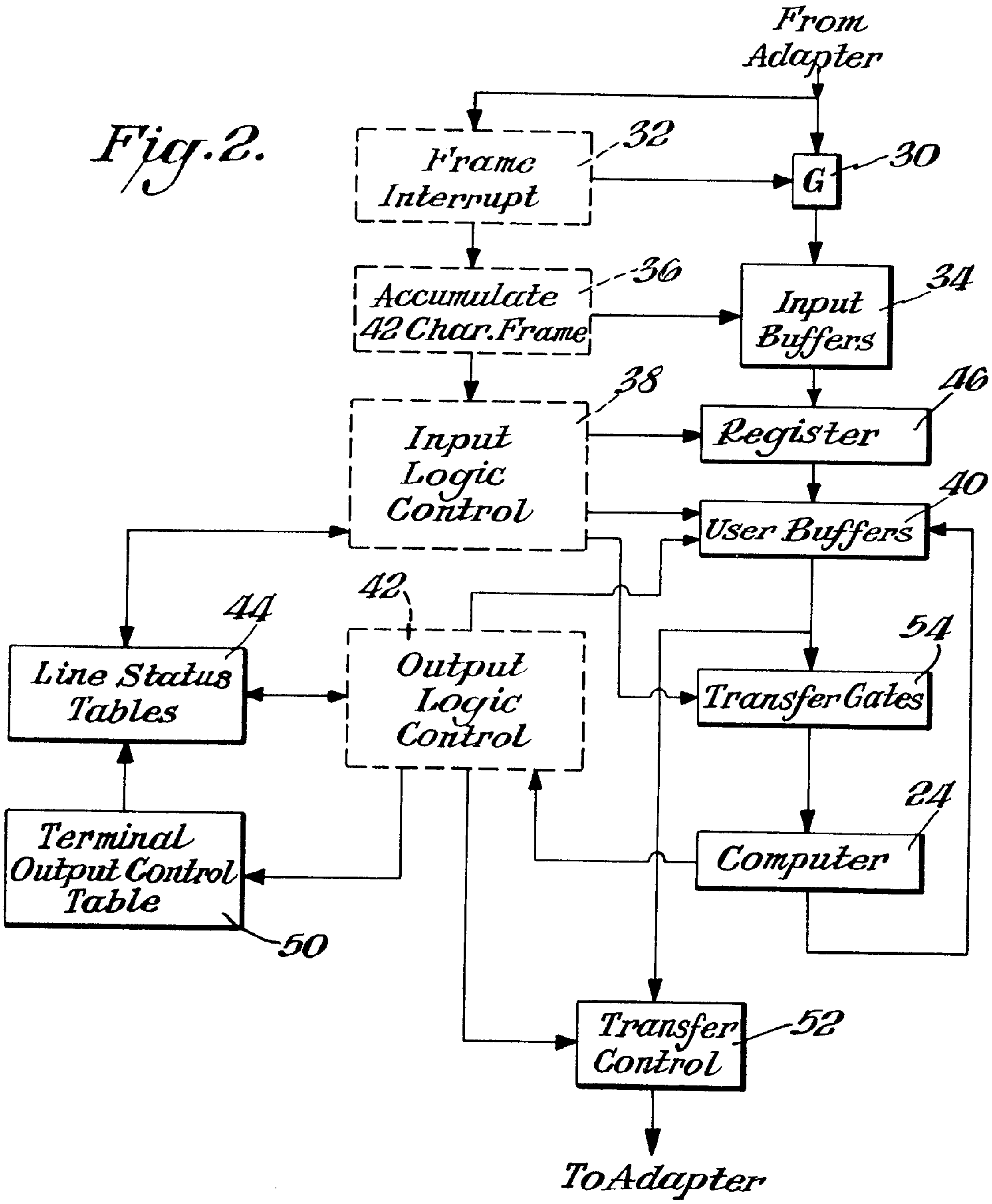
FIG. 2 is a partial block schematic diagram of a system incorporation a logic flow diagram depicting the operation of the central computer illustrated in FIG. 1.

The details of the logic and system employed in the central processing unit 22 are shown in the block schematic of FIG. 2 wherein it is seen that information from the adapter 20 is passed to an input gate 30 which, under the control of the frame interrupt signal from the adapter 20, operates to open the gate 30 to permit the frame of multiplexed information to pass on to a group of input buffers 34. The logic sequence control of the unit 22 is illustrated symbolically by the dashed blocks 32, 36, 38 and 42. These logic blocks whether programmed or hard-wired, control the physical hardware elements shown in solid line blocks. These input buffers may be any suitable storage device. Preferably, a drum storage unit is employed for this purpose since it has sufficient speed to accommodate all of the user input terminals at the same time providing adequate storage for reasonable length messages to be temporarily stored prior to regrouping. Whatever the storage used, the central processing unit 22 (FIG. 1) is programmed as noted by the logic block 36 to accumulate the entire 42 character frame in an input buffer 34 and then transfer each of the characters making up the frame under the control of the input logic transfer control sequence, denoted by the dashed block 38, into a register 46 in which each character is examined and the input logic control 38 completed. The character is then transferred to the appropriate one of the user buffers 40 which also may be drum-type buffers. These user buffers 40 may be nothing more than assigned specific storage buffers or storage locations for each of the several user terminals. Hence, it is seen that the demultiplexing at this stage is accomplished by a computer rather than the utilization of a conventional multiplexing unit.

The logic sequences pursued by the input logic control are set forth in the input logic flow sheet illustrated in FIG. 3. The input logic is implemented in conjunction with the several line status tables denoted by the block 44. There is a separate line status table 44 associated with each of the user buffers. Each line status table, i.e., a separate storage location in the storage portion of the computer 22 (FIG. 1) for each user terminal, or input line corresponding to a terminal, includes a 16 bit table having 34 bytes. The line status table in this embodiment is described as being in the hexidecimal system with 16 bits being assigned to each half word. On the information stored therein, the first 2 bytes 0 and 1 comprise the line status word which is a half word depicting the current status of the associated user terminal. Byte 2 includes a field used to denote the type of user terminal assigned to the particular line status table, i.e., whether the line assigned to a particular port on the multiplexer contains an eight-level code (if the field is reset the byte equals 0) or a five-level code (if the field is set the byte set equals 2). The contents of the field of byte 3 indicates which of the two line buffers assigned to each port of the multiplexer is currently being used — there are two input line buffers assigned for each input line. Bytes 4 and 5 hold the output timing pattern which is essential to the variable output transfer rates of this invention. This timing pattern is a bit pattern that indicates when a character may be presented to the multiplexer (bit set equals 1) or when an idle (signifying character not assembled) character must be presented to prevent overlap.

Each time a character is to be presented to the multiplexer the bit pattern is shifted left one bit in the line status table in accordance with this invention. This shifted bit is then tested and then discarded as will be described in conjunction with the output logic control 42. The shifted output bit indicates the transmission mode during the present time period of the multiplexing cycle. When the pattern becomes exhausted, a newly initialized pattern is retrieved from the terminal output control table 50 as will be described hereinafter. The rightmost bit in this field is used to indicate three row (0) or four row (1) TWX lines. This indicator bit position is used in conjunction with the input logic control 38 as will be described. This indicator bit permits a particular output timing pattern to repeat. Another byte (6) in the line status table holds the count to be set in the output timing counter, which is part of the output logic control 38 and which indicates the number of valid timing pattern bits which may be shifted and tested. When the timing counter is decremented to 0, a new timing pattern is moved to bytes 4 and 5 of the appropriate line status table 44 and the count in the counter re-initialized to its original value.

Returning now to the description of FIG. 2, it is noted that the terminal output control table 50 may pass information into the line status tables 44 and operates under control of the output logic control 42. Under output logic control, there may be an order to modify the timing pattern in the line status table which then actuates the terminal output control table 50 to transfer a new count into byte 26 of the line status tables 44. The terminal output control table may be nothing more than assigned storage space in a memory or specific storage elements. The output timing pattern held in the several line status tables 44 is used to prime or open the transfer control gates 52 which control the outputting of characters back to the adapter 20. The logic step of checking the associated line status table also is used to control the transfer gates 54 which control the transfer of the input information from the user buffers 40 to the computer 24.

Figure 3A:
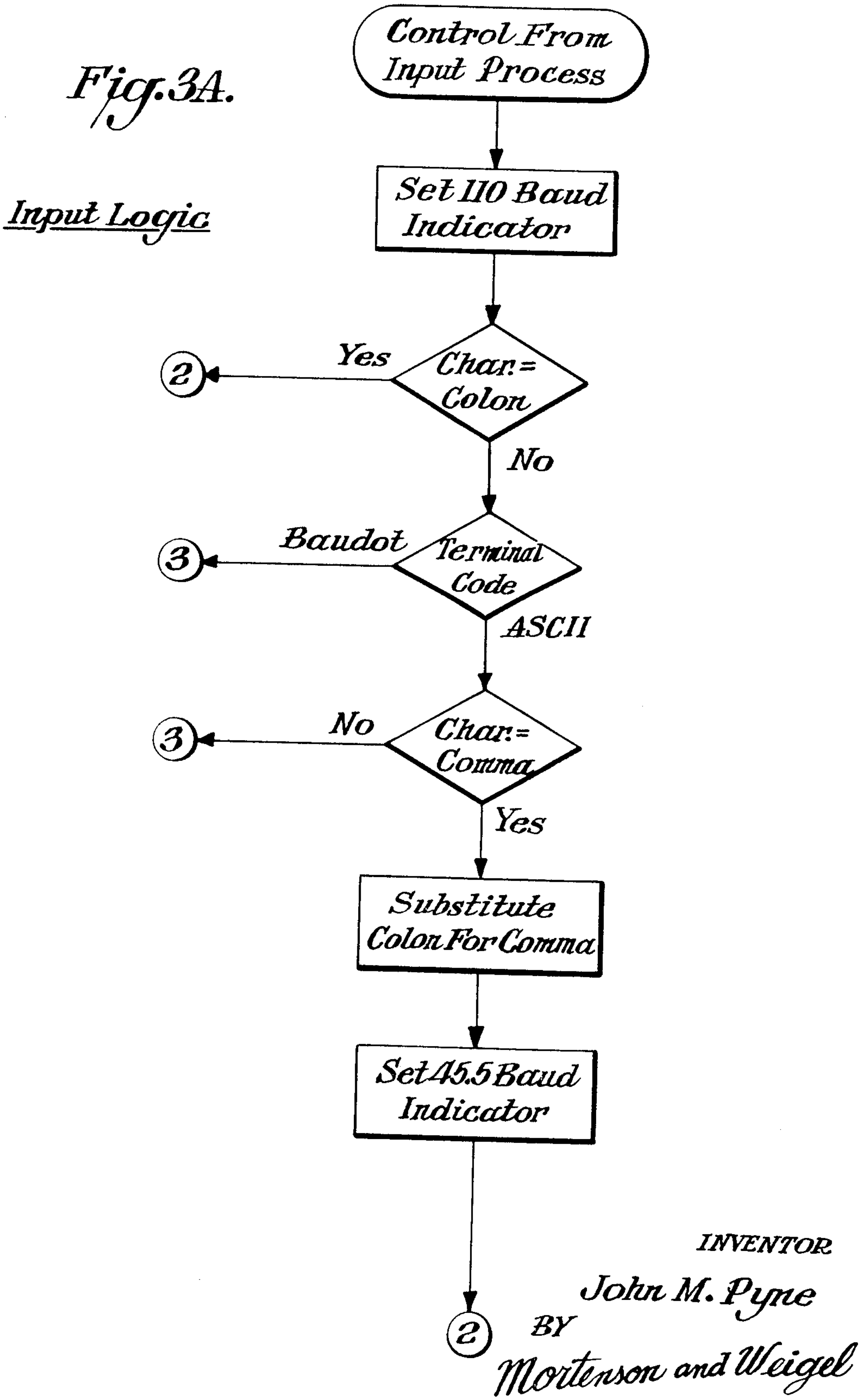
FIGS. 3A, 3B and 3C comprise a logic flow diagram depicting the input logic utilized in the central computer for handling the characters received from the different user terminals.
Figure 3B:
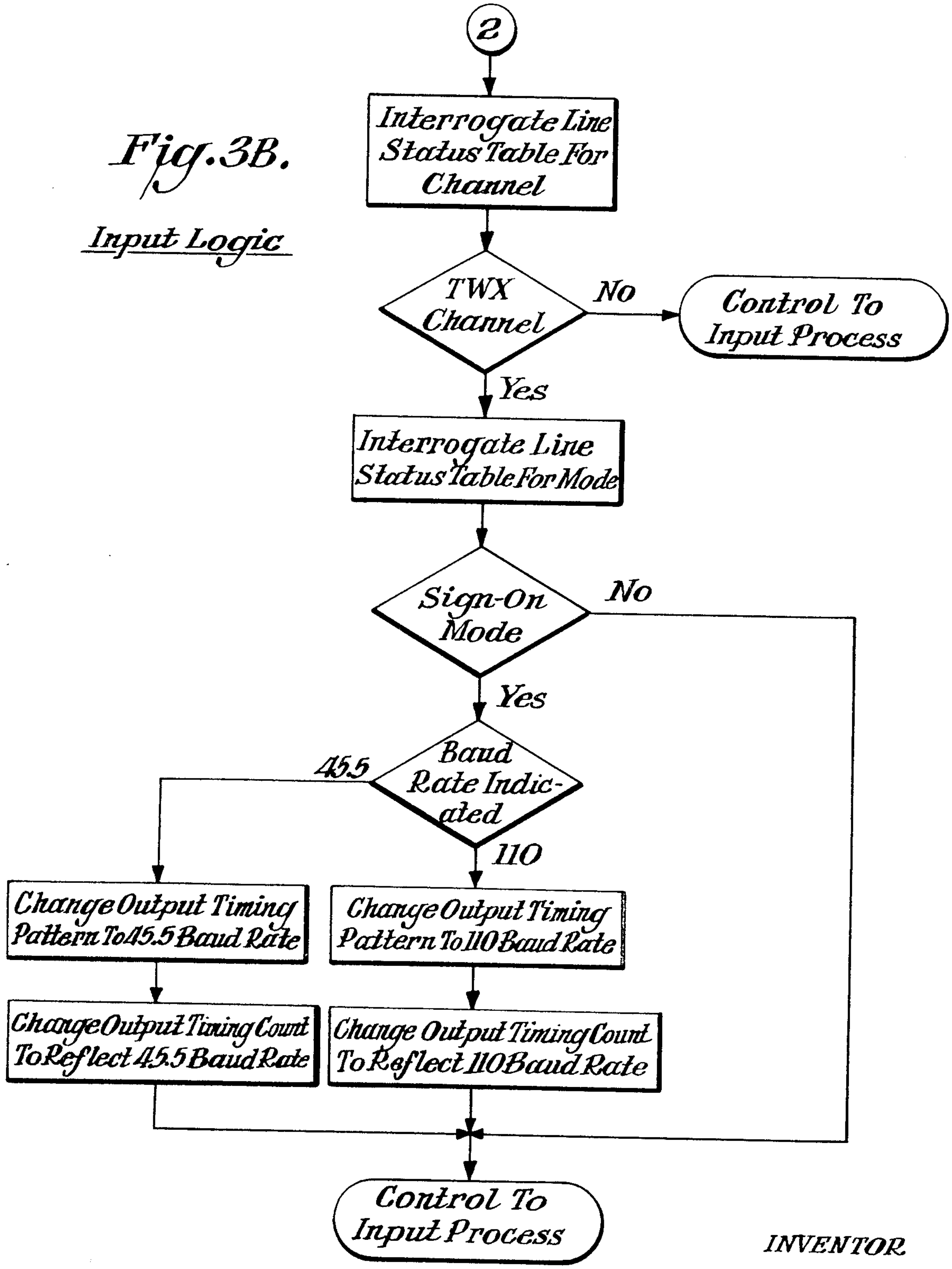
Figure 3C:
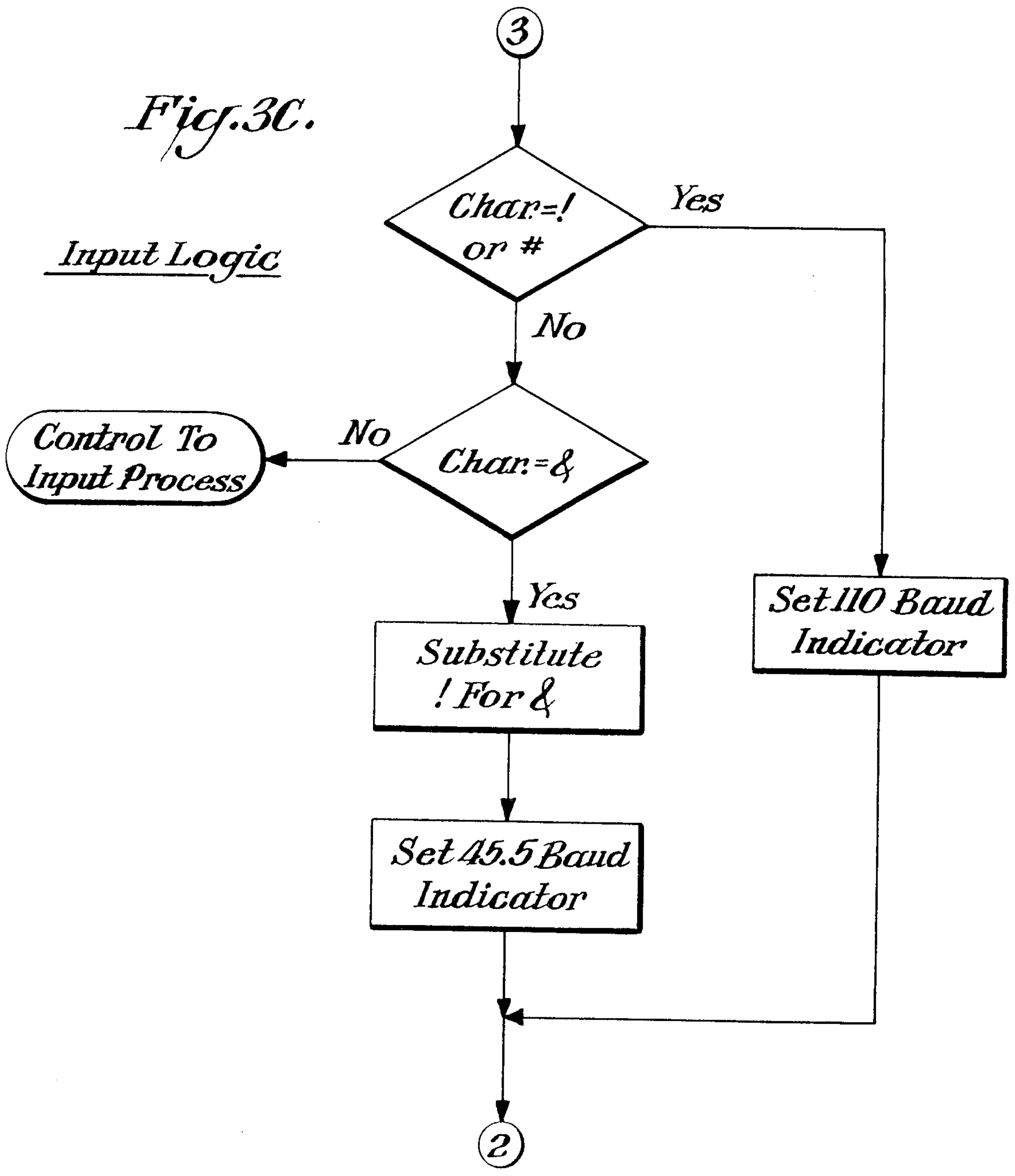
Figure 4A:
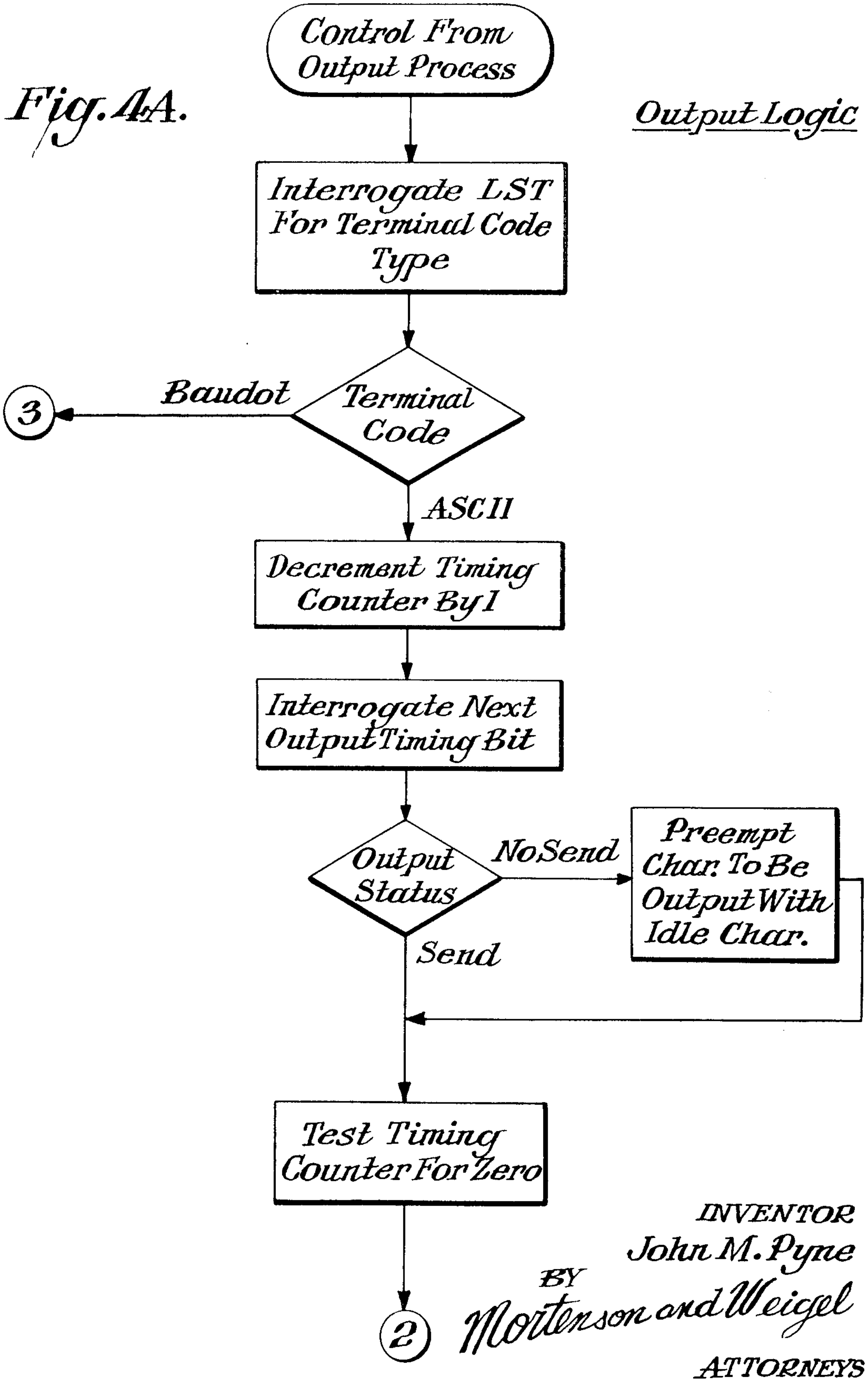
FIGS. 4A, 4B and 4C comprise a logic flow diagram depicting the manner in which processed information from the computer is processed for retransmission back to the several user terminals at the proper operating rates.
Figure 4B:
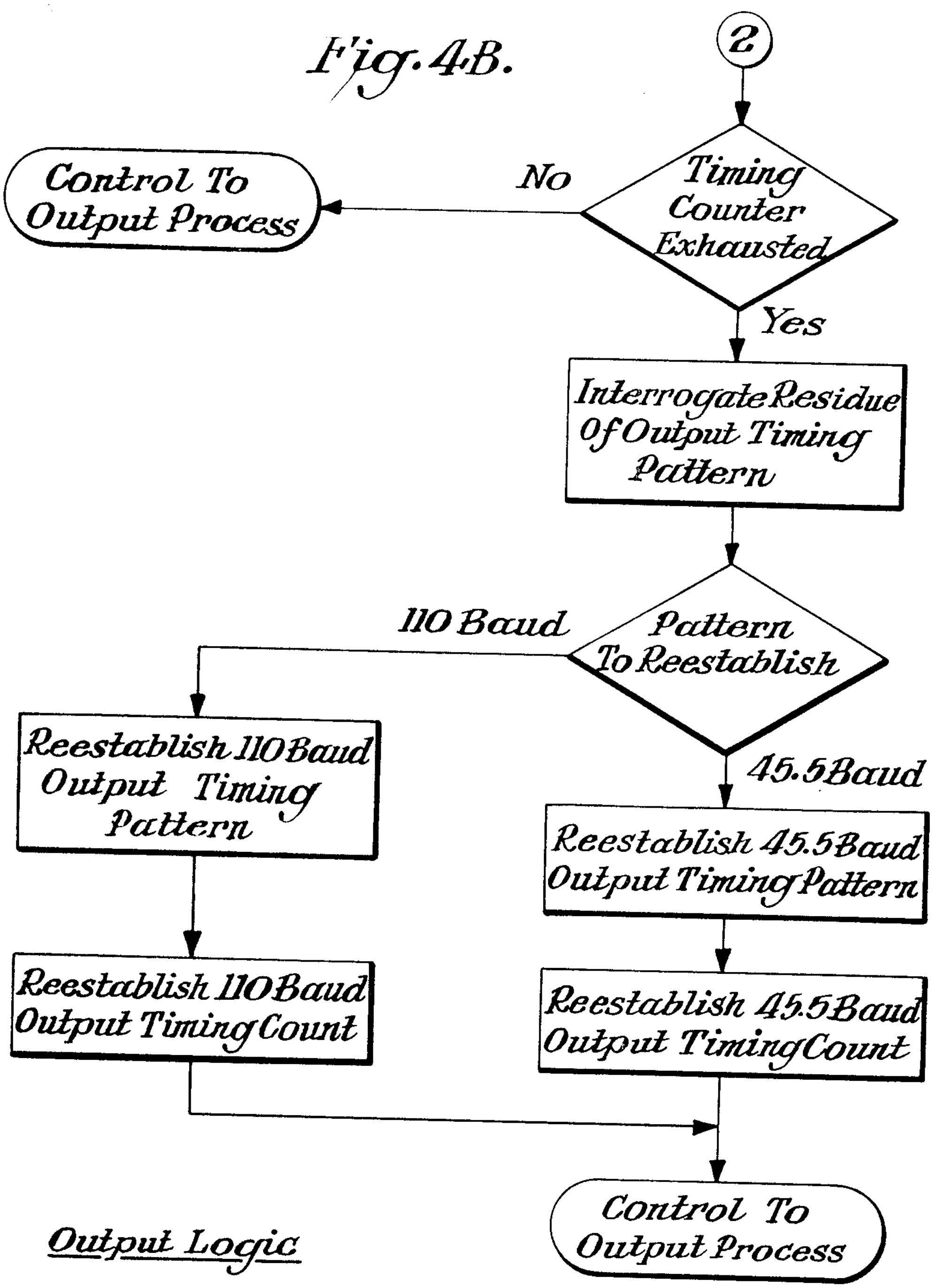
Figure 4C:
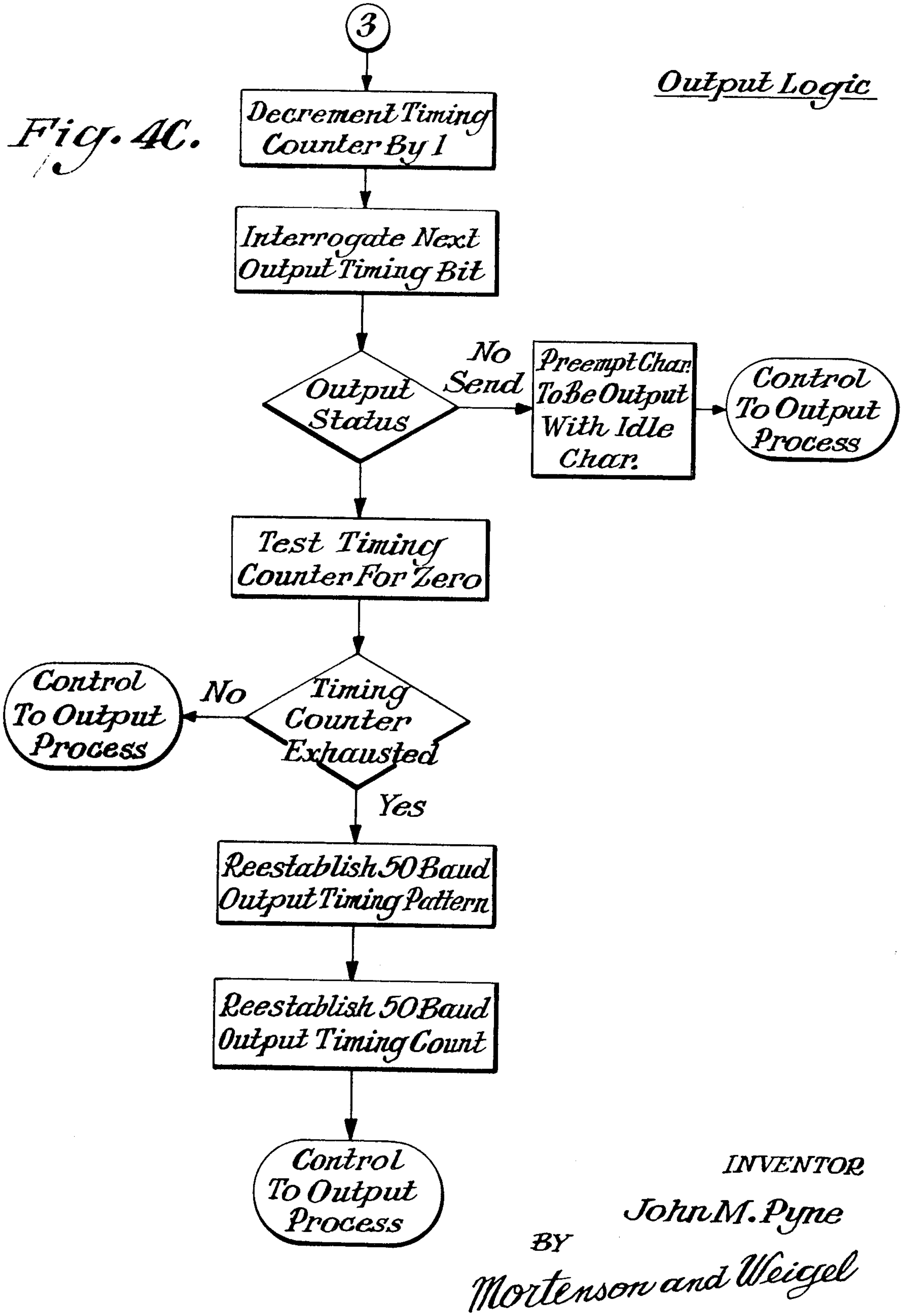

Utilizing conventional programming techniques the method of this invention may be implemented utilizing the systems of FIGS. 1 and 2 and following the input logic set forth in FIGS. 3A, 3B and 3C and the output logic set forth in FIGS. 4A, 4B and 4C. Utilizing this logic, as each incoming multiplexed character is transferred to the register 46, it is examined by the input logic control 38 to determine whether to change the normal speed at which the return information will be transmitted back to the user terminal. As each multiplexed character is examined, a baud rate indicator in the input logic is set to a 0 to indicate a nominal 110 baud timing rate. If the character examination reveals an end of transaction character, a colon (:), the line status table is examined to determine what type of terminal the character is from. This information is held in byte 2 of the line status table. If the channel is not a TWX channel, no further action is necessary. The next sequential character is analyzed with the logic control 38 being returned to its immediate sequence.

Bytes 0 and 1 of the line status table are interrogated to determine the mode of that particular user terminal. If this mode is not sign-on, control is returned to input processing and no further modification is necessary — the next character may be examined. In the alternative, if the sign-on mode is in existence, the baud rate indicator is interrogated to determine the baud rate that is indicated. If the 110 baud rate is indicated by the zero setting indicating a four-row TWX, the output timing pattern held in byte 4 and part of 5 is changed to the 100 baud rate by transferring from a terminal output control table 50 into the line status tables 44 (FIG. 2) the appropriate timing pattern. In addition, the appropriate count held in byte 26 is also changed by an appropriate transfer from the terminal output control table 50. Now, control is returned to input processing.

In the alternative, had the indicated baud rate been 45.5, as denoted by a 2 setting in the baud rate indicator in the input logic control, corresponding to the three row TWX, then the output timing pattern held in the line status table 44 would have been changed to an appropriate pattern for the 45.5 baud rate. A corresponding change would have been made in the output timing counter held in byte 26 of the line status table. Now, control is returned to input processing.

If in the initial character examination, a colon had not been found, the line status table is then interrogated to determine if the character is from a user terminal utilizing either Baudot code or ASCII code. If the ASCII code is determined, the character is then examined to determine if it is a comma or not denoting an end of transaction character. In this event a colon is substituted for a comma after the user terminal identification and the baud rate indicator is set to a 2 to indicate a 45.5 baud timing rate. Next the logic just described for when the character was initially determined as a colon is now pursued.

If the code had instead been a Baudot code, the logic then would have examined to see if the character were an exclamation mark (!) denoting a four row EOB or " " indicating a telex EOB. If this is the case, the baud rate indicator is set to equal 0 for a 110 baud timing rate. The logic following the determination of the initial colon (:) is pursued. Alternatively, if the character is neither an exclamation mark (!) nor a ( ) the character is examined to determine if it is an ampersand (&) indicating a three-row EOB. If this is not the case, control is returned to input processing and the next character is examined. Alternatively, if the character is an (&), the exclamation mark is substituted therefor and the baud rate indicator is set to 2 to indicate a 45.5 baud rate and the logic following the initial colon (:) determination is pursued.

Thus, in summary it may be said that the user terminal output speed is dynamically changed when either the end of transaction character, a colon (:), or the alternate end of transaction character, a comma (,), is encountered provided it is the sign-on made. When the alternate end of transaction character is sensed and the user terminal is ASCII special logic is executed. First the colon is substituted for the input comma. Secondly, a special 45.5 baud rate indicator is set. Thirdly, the user terminal is determined to be either TWX or dataphone. Finally, it is determined whether a user firm and branch code had just been entered. If all criteria are met, that is the character is comma or exclamation mark, it is coming from a TWX user and it delineates a user firm and branch code, then the special 45.5 baud output timing pattern and count are set up. Once this special pattern is established it is self-sustaining until the TWX user indicates that he is a 110 baud terminal. This is done by either entering a colon or exclamation mark after the firm and branch code of a subsequent user sign-on. The effect is to return the output send rate to a normal 110 baud.

If the alternative, if the input character is from a Baudot terminal, is not an ASCII comma, colon, or exclamation mark, then this special character processing is not performed.

The several line status tables have now been prepared to supply the suitable output timing pattern necessary to transmit the characters back to the input user terminals at the proper character transfer rates. This particular rate is determined in the final instance by the output logic steps illustrated in FIGS. 4A, B and C.

In this output logic, the characters are now passed from the user buffers 40 and processed in the computer 24 (FIG. 2) and returned to the user buffers 40 (FIG. 2) and the output logic executed to control the transfer rate back to the respective user terminals. To begin with, the indicated line status table 44 for the particular character is interrogated to ascertain the terminal code type. If the code, i.e., Baudot or ASCII, is ascertained to be ASCII from the line status table denoting that the user terminal is either dataphone or TWX, the timing counter is decremented by 1 and the next output timing bit is interrogated. If this bit is 1, the timing counter is tested for 0. If the timing counter is found to be 0, the residue of the output timing pattern is now interrogated. If this residue is found to be 0, the pattern to establish now is seen to be 45.5 baud which pattern is then established in both the output timing pattern from the terminal output control table 50 and also in the output timing counter and control is returned to output processing.

If, on the other hand, the residue of the time pattern is found to be non-zero indicating a 110 baud rate is desired, the 110 baud output timing pattern and the output timing count corresponding thereto are reestablished in the line status tables 44 from the terminal output control table 50 and control is again passed to the output processing logic for the next character to be sent.

If the timing counter in its initial test had been found to be non-zero after it is decremented, another data character is transferred to the adapter and the timing rate remains as established previously. In like manner if the status of the output timing bit had been determined to be 0, an idle character is generated and passed on through the transfer control 52 to the adapter 20 such that the multiplexing frame would contain an idle character. If, when the initial code were determined upon interrogation of the line status table, to be Baudot, indicating that the terminal user is telex, the timing counter is next decremented by 1 and the next output timing bit interrogated. If the bit is a 1, indicating the character is to be sent, the timing counter is next tested for 0. If it is not 0, the control is returned to the logic sequence. If it is 0, it is necessary to reestablish a 50 baud output timing pattern and a timing count corresponding to the 50 baud rate after which control is again returned to the normal output processing. If the interrogation of the timing bit indicated that no character was to be sent, an idle character is generated as previously described and transferred to the multiplexer.

Thus, according to the method of this invention, the timing counter for each output line is decremented and tested for 0. If it is 0, the residue of the exhausted timing pattern is tested to determine which output timing pattern to re-establish. Utilizing this concept, the user terminal output speed may be dynamically changed periodically to accommodate any given user terminal. If the residue of the output timing pattern is not 0, the original speed is retained and the output timing pattern and counter are replenished. If, on the other hand, the residue is 0, a special lower baud timing pattern and counter are used.

Figure 6:
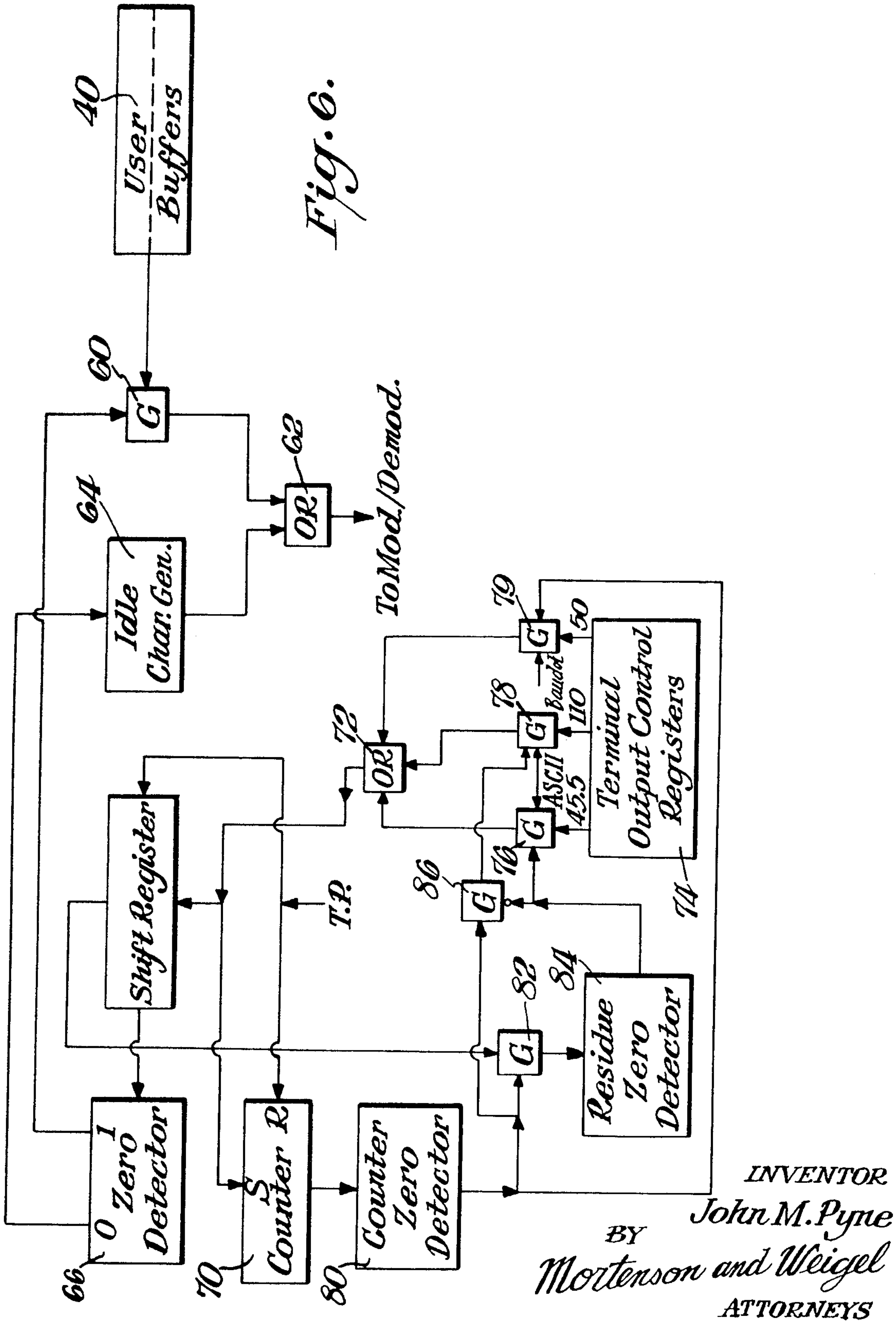
FIG. 6 is a block diagram depicting a hard-wired system capable of retransmitting information held in a user buffer in the central computer back to a particular user terminal.

The programmed logic of this invention for transferring characters to different user terminals having different operating speeds also may be implemented using a hard wired system rather than the logic described by utilizing the system illustrated in the block diagram of FIG. 6. Actually, any programmable computer having sufficient buffer storage may be used in conjunction with the hereinbefore described logic. In this figure each of the user buffers 40, of which only one is shown, which contain the information to be transmitted back to the user terminals, is coupled through a separate gate 60 to an OR circuit 62 to the adapter and modulator/demodulator as described hereinbefore. In like manner an idle character generator 64 is also coupled through the OR circuit to the modulator/demodulator. Both the idle character generator 64 and the gates 60 are triggered respectively by a zero detector 66 which is coupled to receive the shifted output of a shift register 68 whose contents are shifted from the right to the left upon the receipt of timing pulses from a suitable source of timing pulses T.P. (not shown). These timing pulses are also connected to the reverse count input of a suitable counter 70. The counter 70 as well as the shift register 68 may be set in the first instance with an appropriate binary number representation coupled from the OR circuits 72 which in turn are supplied by the terminal output control registers 74. These registers 74 contain respective timing patterns corresponding to the 45.5 baud rate, the 110 baud rate and the 50 baud rate. Information as to the appropriate number of shifts for each baud rate (each user terminal) is also stored in the registers 74 to control the transfer. Each of these respective outputs are coupled through separate gates 76, 78 and 79 to the OR circuit 72. The contents of the shift register are coupled through gates 82 to a zero detector 84 whose output is connected to the 45.5 baud gate 76 and to an inhibit gate 86 which couples the output of another zero detector 80 to the 110 baud gate 78. In like manner, the zero detector 80 is coupled to prime the 50 baud gate 79. Each of these gates 76, 78 and 79 may be primed by a suitable input from the input logic, ASCII or Baudot, of this system (FIG. 2). The zero detector 80 is coupled to the output of the counter 70 and its output, upon the detection of a zero, primes the gates 82. Also the output of the zero detector 80 is coupled through a gate 86 to prime the 110 baud gate 78 unless inhibited by the zero detector 84 which provides an inhibit input to the gate 86 and a priming input to the 45.5 baud gate 76.

If it is assumed initially that the input logic triggers the 45.5 baud gate 76 to pass the 45.5 baud timing pattern into the shift register 68 and the appropriate count into the counter 70, subsequent timing pulses will shift the bits of the timing pattern from the shift register 68 into the zero detector 66. With each shift the counter 70 is decremented by 1. The zero detector 66 detects each bit shifted to determine if it was a 0 or 1. If it is a 0, the idle character generator 64 transmits an idle character to fill that slot in the multiplex frame to be transmitted back to the user terminal. If on the other hand the shifted bit is a 1, the gate 60 is activated to pass the latest user buffer character onto occupy its position in the multiplex frame for transmission back to the user terminal.

When, and only when, the counter 70 reaches the zero count, does the zero detector 80 recognize this to generate an output pulse to prime gate 82. This gate passes the contents of the shift register 68 to the zero detector 84. If the residue of the timing pattern held in the shift register is 0, the 45.5 baud gate 76 is activated to re-establish this timing pattern dynamically for the particular user buffer 40 under examination. If it is not 0, the inhibit input to the gate 86 is removed and the 110 baud gate 78 is activated to dynamically re-establish this timing pattern and count for the buffer 40 under examination. If in the first instance a Baudot code has been used such that the gate 79 is primed by this logic level, a detection of zero in the timing counter is sufficient to energize the 110 baud gate 79 to establish a 50 baud rate in the shift register 68 and the corresponding count in the counter 70. In this description of FIG. 6, for simplicity many timing pulses necessary to control the operation have been omitted.

There has thus been described a relatively simple method and system whereby an output timing pattern or mask may be used to control the transmission of processed characters of information back through a common multiplexing system to various user terminals each having different operating speeds. A separate mask may be stored for each particular operating speed and certain logic tests employed utilizing a simple counter and shift register, either by programming or actual hardware, to ascertain the proper application of the particular timing patterns. These patterns are changed dynamically during the processing of the system.

Many embodiments may be made of this inventive concept, and many modifications may be made in the embodiments hereinbefore described. Therefore, it is to be understood that all descriptive material herein is to be interpreted merely as illustrative, exemplary and not in a limited sense. It is intended that various modifications which might readily suggest themselves to those skilled in the art be covered by the following claims, as far as the prior art permits.

What is claimed is:

1. A method of processing characters of information representations on a real time basis in a data processing unit for transfer to and from first and second data terminals having corresponding first and second different character handling rates, through a time division multiplexer having a third character handling rate different from said first and second rates which multiplexes characters from said terminals for transfer to said unit and demultiplexes characters from said unit for transfer to said terminals, comprising the steps of:

storing output timing pattern representations interrelating the third rate with each of said first and second rates, examining each incoming character to determine its data terminal of origin, processing the characters from each said terminal in said unit to provide processed characters and transferring said processed characters back to respective one of said terminals through said multiplexer under the control of corresponding ones of said stored timing patterns, whereby the transfer rate changes necessary to accommodate said terminals are made.

2. A method according to claim 1 which includes the additional steps of:

storing output timing count representations corresponding to respective ones of said patterns denoting the number of said pattern representations that are to be checked, and testing sequentially according to said count representations each of said pattern representations, and selectively transferring, according to said testing, said processed characters back to said terminals.

3. A method according to claim 2 which includes the addtional steps of:

testing the residue of said pattern representations after said number of pattern representations have been checked, and selecting another one of said stored output timing pattern for controlling said transfer in accordance with said residue.

4. A method according to claim 2 wherein the pattern representations are tested by storing said pattern representations in a shift register and shifting said representations out of said shift register for testing one representation at a time.

5. A method according to claim 2 wherein a non-character representation is transferred back to one of said termials when no transfer is indicated.

6. A system for processing character representations on a real time basis in a data processing unit, said representations being transferred to and from first and second terminals having corresponding first and second different character handling rates through a time division multiplexer having a third character handling rate different from said first and second rates, said multiplexer being adapted to multiplex representations from said terminals for transfer to said unit and to demultiplex characters from said unit for transfer to said terminals, said system comprising:

first and second character storage units for storing representations of characters transferred from each of said terminals in respective ones of said units, first and second line status storage units for storing information relating to the character handling rates of corresponding ones of said terminals, a terminal output storage unit for storing timing pattern representations corresponding to the character transfer rates of different ones of said terminals, test means responsive to said line status storage units for testing each character transferred to said processing unit, gate means coupled to said terminal storage unit and responsive to said test means for transferring timing pattern representations to one of said line status storage units, and transfer means responsive to one of said line status storage units timing pattern representations for transferring processed characters to said multiplexer at the proper rate.

7. A system according to claim 6 wherein said line status units include:

shift register means to shift said timing pattern representations sequentially bit by bit, each bit corresponding to a stored character to be transferred to said multiplexer, detector means for sensing each of said bit representations, and said transfer means being responsive to said detector means.

8. A system according to claim 7 which includes a non-character representation generating means responsive to said detector means for controlling the transfer of a character or non-character to said multiplexer.

9. A system according to claim 7 wherein said line status storage unit includes output timing counting means for storing the number of valid timing pattern representations to be detected, said terminal output storage unit storing a representation of said number for each terminal type, means for transferring said stored number representations to said counting means, and means coupled to the counting means for decrementing the count one for each character transferred.

10. A system according to claim 9 which includes an additional zero detecting means coupled to the counting means for determining when a zero count is reached, and means responsive to said zero count for transferring a new output timing pattern from said output terminal unit to said shift register means.

11. A system according to claim 10 which includes a residue detector for said shift register, and means responsive to the detection of a zero residue for transferring a new timing pattern to one of said line status storage units.

* * * * *